(12) United States Patent
Ueda

(10) Patent No.: US 11,594,243 B2
(45) Date of Patent: Feb. 28, 2023

(54) SOUND SOURCE ESTIMATION SYSTEM AND SOUND SOURCE ESTIMATION METHOD

(71) Applicant: TOYOTA JIDOSHA KABUSHIKI KAISHA, Toyota (JP)

(72) Inventor: Yu Ueda, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 17/645,139

(22) Filed: Dec. 20, 2021

(65) Prior Publication Data

US 2022/0199107 A1   Jun. 23, 2022

(30) Foreign Application Priority Data

Dec. 23, 2020   (JP) .............................. JP2020-214324

(51) Int. Cl.
  *G10L 25/51*   (2013.01)
  *G07C 5/08*   (2006.01)
  *G01M 1/22*   (2006.01)

(52) U.S. Cl.
  CPC .............. *G10L 25/51* (2013.01); *G01M 1/22* (2013.01); *G07C 5/0808* (2013.01)

(58) Field of Classification Search
  None
  See application file for complete search history.

(56) References Cited

U.S. PATENT DOCUMENTS

| 2007/0032968 | A1 | 2/2007 | Nakamura |
| 2019/0080528 | A1* | 3/2019 | Bednar ................. G07C 5/006 |
| 2020/0043258 | A1* | 2/2020 | Jiang ..................... G07C 5/0825 |
| 2021/0192860 | A1* | 6/2021 | Kale ........................ G06N 3/08 |
| 2021/0335061 | A1* | 10/2021 | Claessens ............ G07C 5/0816 |
| 2021/0342211 | A1* | 11/2021 | Melo ..................... G06F 11/079 |

FOREIGN PATENT DOCUMENTS

| JP | 2005-98984 A | 4/2005 |
| JP | 4529602 B2 | 8/2010 |

* cited by examiner

*Primary Examiner* — Paul W Huber
(74) *Attorney, Agent, or Firm* — Oblon, McClelland, Maier & Neustadt, L.L.P.

(57) ABSTRACT

A sound source estimation system includes a microphone that detects sound which is generated from an object including a rotary device, a rotation speed acquiring unit that acquires a rotation speed of the rotary device, a frequency analyzing unit that generates frequency sound data indicating change of a frequency spectrum of sound detected by the microphone, a degree calculating unit that calculates a degree based on a loudest sound frequency indicating loudest sound out of frequencies of the sound and the rotation speed, and a degree comparing unit that determines a component with a degree closest to the degree as a sound source candidate of the noise.

5 Claims, 8 Drawing Sheets

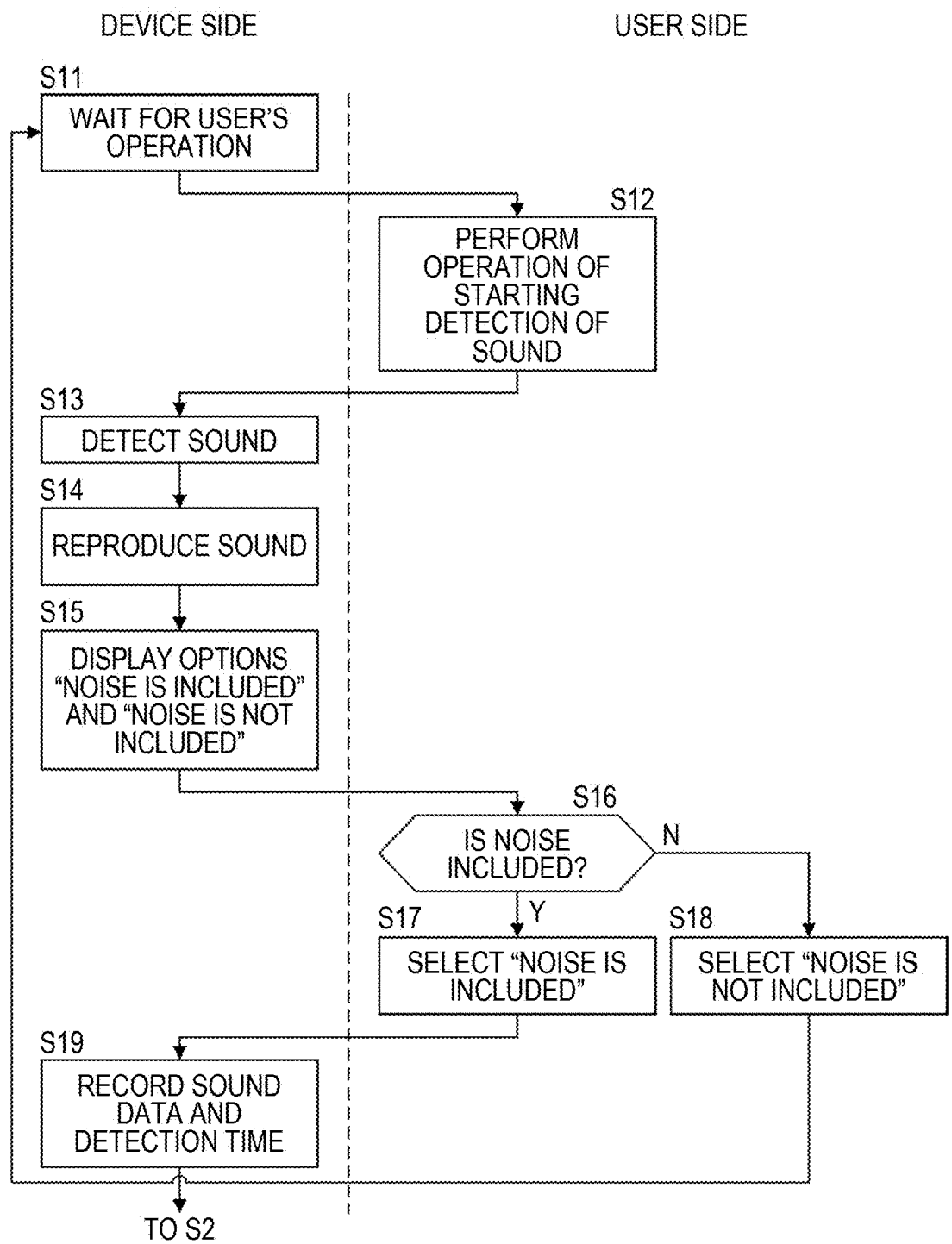

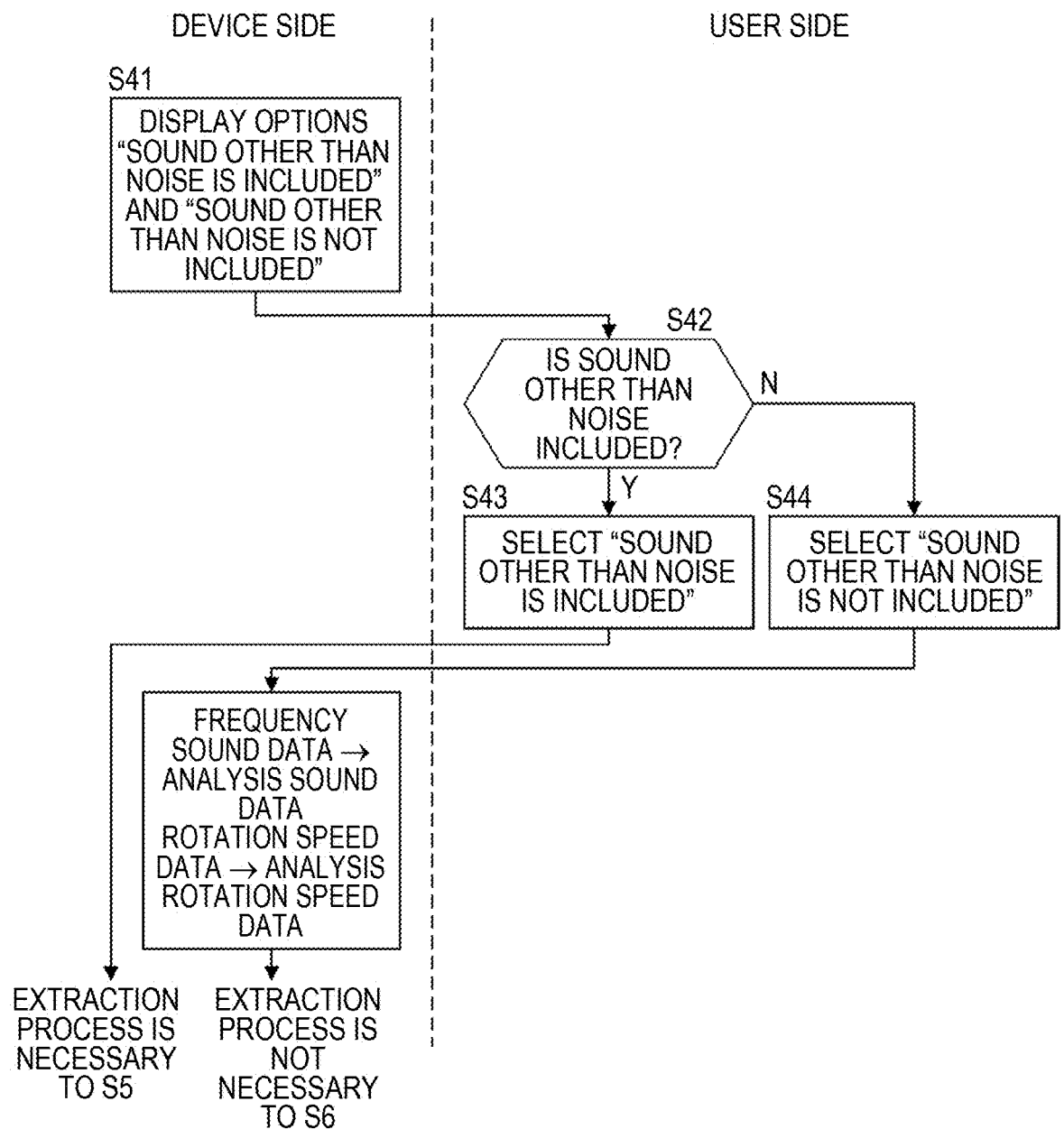

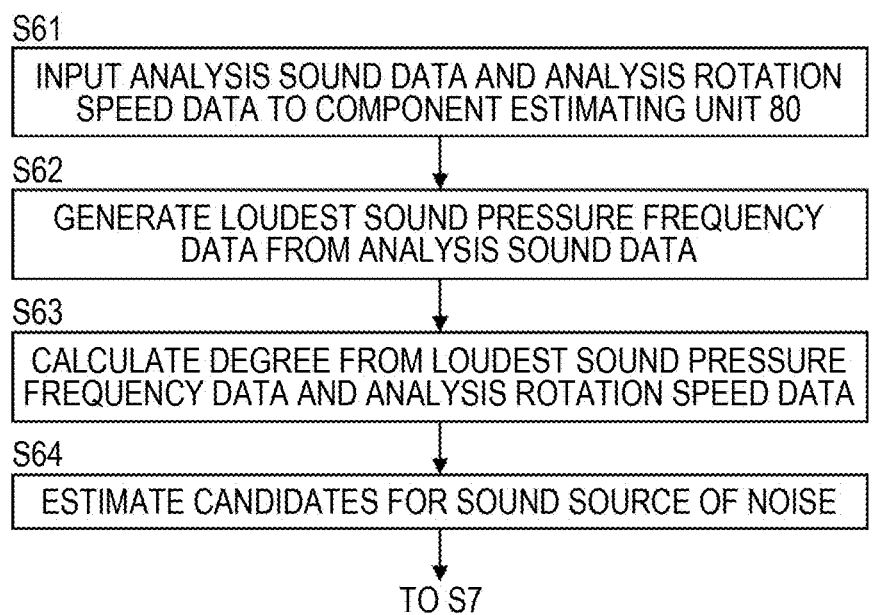
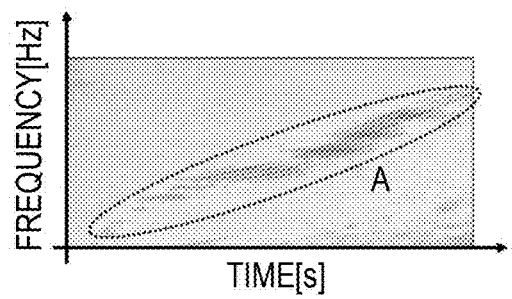

SOUND SOURCE ESTIMATION SYSTEM AND SOUND SOURCE ESTIMATION METHOD

CROSS-REFERENCE TO RELATED APPLICATION

This application claims priority to Japanese Patent Application No. 2020-214324 filed on Dec. 23, 2020, incorporated herein by reference in its entirety.

BACKGROUND

1. Technical Field

The present disclosure relates to a technique of estimating a sound source that generates sound or vibration with rotation of a rotary device which is mounted in a vehicle.

2. Description of Related Art

Rotary devices that generate a rotational motion are mounted in vehicles. In addition, a plurality of components that moves with the rotational motion such as a gear that transmits the rotational motion is mounted in vehicles. When an abnormality such as cracks or deformation occurs in such components, noise which has not been generated before the abnormality has occurred may be generated with the rotational motion. This noise may give discomfort to a user of the vehicle. Accordingly, in order to replace or repair a component which is a sound source of the noise, it is necessary to identify a sound source component of the noise.

A degree of the noise generated with the rotational motion may be a degree specific to each component (hereinafter referred to as a component degree) which is determined by specifications of the component (for example, a dimension of a gear when the component is a gear). A sound and vibration analysis device disclosed in Japanese Unexamined Patent Application Publication No. 2005-98984 (JP 2005-98984 A) calculates a degree from frequency data of sound which is recorded while a vehicle is traveling and rotation speed data. Since the calculated degree corresponds to a component degree of each gear of a transmission, a gear which serves as a source of the noise can be identified by calculating a degree of sound equal to or greater than a predetermined sound pressure out of sound recorded while the vehicle is traveling.

SUMMARY

However, a plurality of components mounted in a vehicle has individual variations due to manufacturing error the like. Accordingly, there may be a difference between a component degree which is determined by specifications of a component and a degree of sound which is actually generated from the component. In JP 2005-98984 A, a component serving as a source of noise is identified based on the consideration that a degree of sound equal to or greater than a predetermined sound pressure out of recorded sound matches a component degree of the sound source of noise, and individual variations of components are not considered. Accordingly, it may not be possible to accurately identify a source of noise.

According to an aspect of the present disclosure, there is provided a sound source estimation system including: a sound and vibration acquiring unit configured to acquire sound which is generated from an object; a rotation speed acquiring unit configured to acquire a rotation speed of a rotary device which is mounted in the object and which generates a rotational motion; a frequency analyzing unit configured to generate frequency sound data indicating change of a frequency spectrum of sound detected by the sound and vibration acquiring unit; a degree calculating unit configured to calculate a degree of a loudest sound frequency which is a frequency indicating loudest sound in the frequency sound data based on the loudest sound frequency and the rotation speed acquired by the rotation speed acquiring unit; a component degree information acquiring unit configured to acquire degree information of a plurality of components associated with sound which is generated from the plurality of components mounted in the object with the rotational motion; a degree comparing unit configured to determine a component with a degree closest to the degree calculated by the degree calculating unit as a sound source candidate of noise based on the degree information acquired by the component degree information acquiring unit; and an output unit configured to output information on the sound source candidate of noise.

According to another aspect of the present disclosure, there is provided a sound source estimation method including: a sound and vibration acquiring step of acquiring sound which is generated from an object; a rotation speed acquiring step of acquiring a rotation speed of a rotary device which is mounted in the object and which generates a rotational motion; a frequency analyzing step of generating frequency sound data indicating change of a frequency spectrum of sound detected in the sound and vibration acquiring step; a degree calculating step of calculating a degree of a loudest sound frequency which is a frequency indicating loudest sound in the frequency sound data generated in the frequency analyzing step based on the loudest sound frequency and the rotation speed of the rotary device acquired in the rotation speed acquiring step; a component degree information acquiring step of acquiring degree information of a plurality of components associated with sound which is generated from the plurality of components mounted in the object with the rotational motion; a degree comparing step of determining a component with a degree closest to the degree calculated in the degree calculating step as a sound source candidate of noise based on the degree information acquired in the component degree information acquiring step; and an output step of outputting information on the sound source candidate of noise.

According to the present disclosure, a degree is calculated from the loudest sound pressure frequency out of frequencies of sound acquired by the sound and vibration acquiring unit and a rotation speed of the rotary device, and a component having a degree closest to the degree is determined as a sound source candidate. Accordingly, even when there is a difference between a degree indicating a sound pressure equal to or greater than a predetermined value out of recorded sound and a component degree determined by specifications of a component which is a sound source of noise, it is possible to estimate the component which is a sound source.

BRIEF DESCRIPTION OF THE DRAWINGS

Features, advantages, and technical and industrial significance of exemplary embodiments of the present disclosure will be described below with reference to the accompanying drawings, in which like signs denote like elements, and wherein:

FIG. 4 is a diagram illustrating details of a sound data acquiring process;

FIG. 5 is a diagram illustrating details of a process of determining whether an extraction process is necessary;

FIG. 6 is a diagram illustrating details of an analysis process;

FIG. 7 is a diagram illustrating an example of analysis sound data;

DETAILED DESCRIPTION OF EMBODIMENTS

Figure 1:
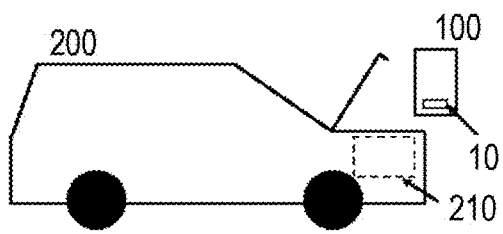
FIG. 1 is a diagram illustrating a sound source estimation device including a sound source estimation system and a vehicle.

Hereinafter, an embodiment of the present disclosure will be described in detail with reference to the accompanying drawings. The same or corresponding elements in the drawings will be referred to by the same reference signs and description thereof will not be repeated.

FIG. 1 is a diagram illustrating a sound source estimation device 100 that includes a sound source estimation system according to an embodiment of the present disclosure and a vehicle 200 that is an object on which estimation is performed by the sound source estimation device 100. An engine 210 and a plurality of components are mounted in the vehicle 200. The engine 210 generates a rotational motion and the plurality of components generates sound or vibration with the rotational motion of the engine 210. A degree of sound which is generated by each component with the rotational motion of the engine 210 is determined by specifications of the corresponding component and is a degree specific to the component (hereinafter referred to as a component degree).

The sound source estimation device 100 includes a microphone 10 which will be described later and can detect sound near the sound source estimation device 100. The vehicle 200 has an engine 210 mounted in a front compartment. When a user of the vehicle 200 feels noise from the vehicle 200, a user of the sound source estimation device 100 estimates a sound source of noise using the sound source estimation device 100.

At the time of estimation of a sound source of noise, the user of the sound source estimation device 100 opens a hood of the vehicle 200 to expose the front compartment to the outside as illustrated in FIG. 1. The user can detect sound near the engine 210 using the microphone 10 by making the sound source estimation device 100 approach the front compartment, and estimate a sound source of noise using the sound source estimation device 100.

Figure 2:
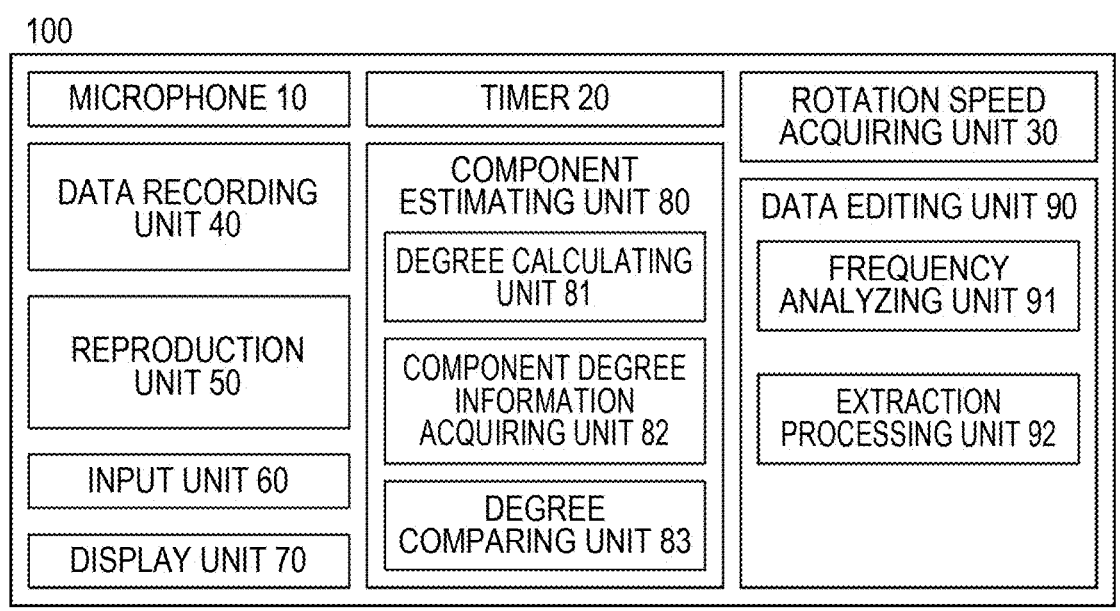
FIG. 2 is a diagram illustrating a configuration of the sound source estimation device including the sound source estimation system.

FIG. 2 is a diagram illustrating the configuration of the sound source estimation device 100 including a sound source estimation system according to the embodiment of the present disclosure. The sound source estimation device 100 includes a microphone 10, a timer 20, a rotation speed acquiring unit 30, a data recording unit 40, a reproduction unit 50, an input unit 60, a display unit 70, a component estimating unit 80, and a data editing unit 90.

The microphone 10 detects nearby sound and generates sound data. The timer 20 measures a detection time which is a period of time in which detection of sound is performed by the microphone 10. The rotation speed acquiring unit 30 acquires a rotation speed of the engine 210 and generates rotation speed data.

The data recording unit 40 is a recording medium such as a flash memory that records the sound data, the detection time, the rotation speed data, and the like. The reproduction unit 50 is a device such as a speaker that reproduces sound data or extracted sound data which will be described later as sound.

The input unit 60 is a device such as a switch, a touch panel, a keyboard, a mouse, or a voice input device that receives a user's operation associated with control of the sound source estimation device 100. When an input operation is performed on the input unit 60, the sound source estimation device 100 performs control based on the input operation. The display unit 70 is a device such as a liquid crystal display panel that displays information on control of the sound source estimation device 100 or options for the control to a user.

The component estimating unit 80 estimates a sound source candidate of noise based on a degree which is calculated from analysis sound data and analysis rotation speed data which will be described later. The component estimating unit 80 includes a degree calculating unit 81, a component degree information acquiring unit 82, and a degree comparing unit 83.

The degree calculating unit 81 calculates a degree of sound which is estimated to be noise by performing a routine which will be described later on the analysis sound data and the analysis rotation speed data.

The component degree information acquiring unit 82 acquires component degree information of each component of a plurality of components that emits sound with rotation of the engine 210. A component degree of each component is determined, for example, by dimensions of a gear when the component is a gear. The component degree information of the components is stored in advance in the data recording unit 40, and the component degree information acquiring unit 82 acquires component degree information of the components from the data recording unit 40. A user of the vehicle 200 may register a model number of the vehicle 200 in advance, a type of the engine 210, or the like in the sound source estimation device 100, and the component degree information acquiring unit 82 may acquire the component degree information by communication with an external server.

The degree comparing unit 83 estimates a candidate for a component which is a sound source of noise by comparing the degree of noise calculated by the degree calculating unit 81 with component degree information of each component acquired by the component degree information acquiring unit 82.

The data editing unit 90 edits the sound data and the rotation speed data recorded in the data recording unit 40, and generates analysis sound data and analysis rotation speed data. The data editing unit 90 includes a frequency analyzing unit 91 and an extraction processing unit 92.

The frequency analyzing unit 91 performs frequency analysis on sound data. The sound data detected by the microphone 10 represents change of a sound pressure with respect to time. The frequency analyzing unit 91 performs fast Fourier transform (FFT) on the sound data and generates frequency sound data representing change of a frequency spectrum with respect to time.

The extraction processing unit 92 performs an extraction process of extracting arbitrary frequency sound data such as frequency sound data in a specific time range or frequency sound data in a specific frequency band from the frequency sound data generated by the frequency analyzing unit 91, and generates extracted sound data.

Figure 3:
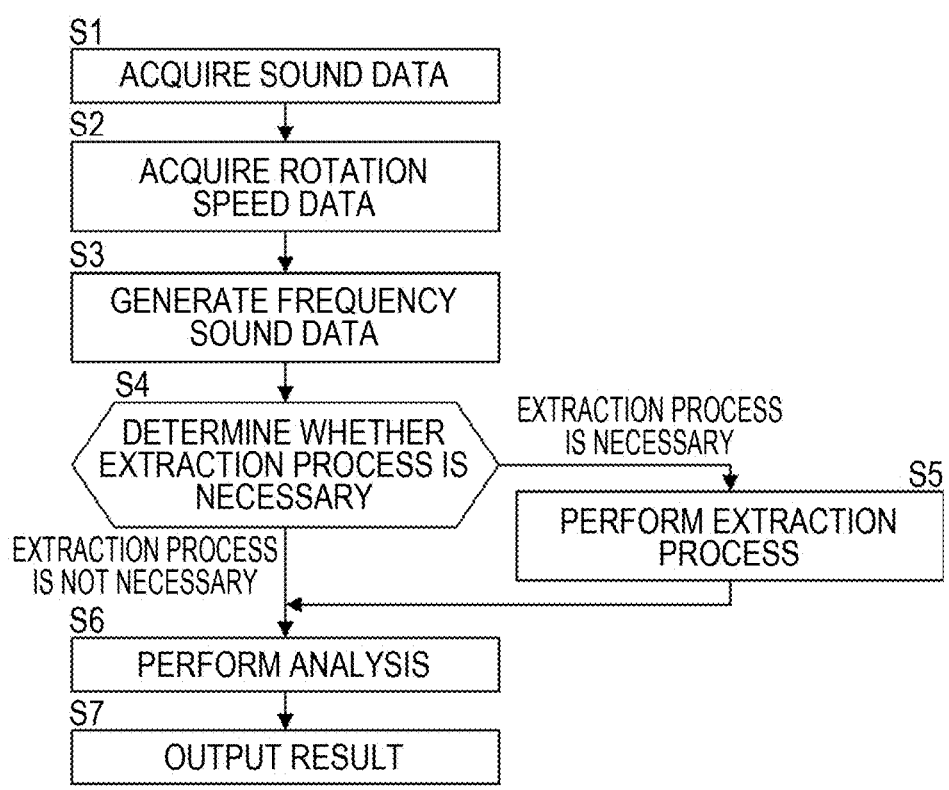
FIG. 3 is a diagram schematically illustrating a sound source estimating process.

A routine of estimating a sound source according to this embodiment is schematically illustrated in FIG. 3. S1 is a step of detecting noise and acquiring sound data. S2 is a step of acquiring rotation speed data corresponding to the acquired sound data. S3 is a step of performing frequency analysis on the sound data and generating frequency sound data. S4 is a step of determining whether an extraction process which will be described later needs to be performed on the frequency sound data. S5 is a step of performing the extraction process on the frequency sound data or the rotation speed data. S6 is a step of estimating a component which is a candidate for a sound source of noise by performing analysis based on the frequency sound data and the rotation speed data. S7 is a step of outputting information on the component which is a candidate for a sound source.

Details of the step (S1) of acquiring sound data will be first described below with reference to FIG. 4. First, the sound source estimation device 100 waits for an input of an operation associated with detection of sound to the input unit 60 from a user (S11).

The user makes the microphone 10 of the sound source estimation device 100 approach the engine 210 in operation, and performs an operation of starting detection of sound on the input unit 60 in this state (S12).

Accordingly, the sound source estimation device 100 starts detection of sound using the microphone 10 and detects sound near the engine 210 in operation (S13). The detection of sound using the microphone 10 may be performed for a preset time or may be performed only when the user continues to perform an operation such as a long push of the input unit 60. At this time, the timer 20 measures a detection time which is a period of time in which detection of sound using the microphone 10 is performed.

Then, the sound source estimation device 100 reproduces the detected sound through the reproduction unit 50 (S14). Accordingly, the sound source estimation device 100 can allow the user to ascertain the detected sound.

Then, the sound source estimation device 100 displays options such as "noise is included" and "noise is not included" on the display unit 70 (S15).

The user determines whether noise is included in the sound ascertained in S14 (S16) and selects one option using the input unit 60. When "noise is included" is selected (S17), the sound source estimation device 100 records the detected sound as sound data in the data recording unit 40. The detection time measured by the timer 20 is recorded in the data recording unit 40 in correlation with the sound data (S19).

When "noise is not included" is selected (S18), the sound source estimation device 100 returns to the state (S11) in which it waits for an input of an operation associated with detection of sound from the user.

In S15, an option "sound is reproduced" in addition to the two options may be displayed on the display unit 70. When the user selects "sound is reproduced" using the input unit 60, the detected sound is reproduced using the reproduction unit 50. Accordingly, the user can ascertain the detected sound again.

Through these steps, the sound source estimation device 100 can generate sound data including noise which is generated in the vehicle 200.

After sound data has been recorded, the sound source estimation routine proceeds to the step of S2 in FIG. 3 and the sound source estimation device 100 acquires rotation speed data corresponding to the sound data.

In S2, the rotation speed acquiring unit 30 acquires the rotation speed of the engine 210. As the method of acquiring the rotation speed, a method of acquiring control information from an ECU that controls the engine 210 is conceivable. The sound source estimation device 100 acquires control information of the ECU of the vehicle 200 by communicating with the vehicle 200. The rotation speed acquiring unit 30 acquires the rotation speed of the engine 210 for a period of time corresponding to the detection time recorded in the data recording unit 40, and generates rotation speed data. The generated rotation speed data is recorded in the data recording unit 40 in correlation with the sound data.

Then, the sound source estimation routine proceeds to the step of S3 in FIG. 3 and the sound source estimation device 100 generates frequency sound data. In S3, the sound data is input to the data editing unit 90. The frequency analyzing unit 91 performs FFT on the sound data input to the data editing unit 90 and frequency sound data is generated.

Then, the sound source estimation routine proceeds to the step of S4 in FIG. 3 and it is determined whether an extraction process needs to be performed on the frequency sound data. Details of the step of S4 will be described below with reference to FIG. 5.

The sound source estimation device 100 displays options such as "sound other than noise is included" and "sound other than noise is not included" on the display unit 70 (S41).

The user determines whether sound other than noise is included in the sound ascertained in S14 (S42) and selects one option using the input unit 60. When "sound other than noise is included" is selected (S43), it is determined that a process of extracting frequency sound data in a specific frequency band or a specific time range needs to be performed and the extraction processing unit 92 performs a process of extracting frequency sound data and rotation speed data in S5. Accordingly, analysis sound data and analysis rotation speed data subjected to the extraction process for excluding sound other than noise are generated. Details of the extraction process which is performed in S5 will be described later.

When "sound other than noise is not included" is selected (S44), it is determined that the extraction process does not need to be performed, the frequency sound data and the rotation speed data are set as analysis sound data and analysis rotation speed data, and the routine proceeds to S6.

In S41, an option "sound is reproduced" in addition to the two options may be displayed on the display unit 70. When the user selects "sound is reproduced" using the input unit 60, the detected sound is reproduced using the reproduction unit 50. Accordingly, the user can ascertain the detected sound again.

The analysis step which is performed in S6 will be described below with reference to FIG. 6. First, analysis sound data and analysis rotation speed data are input to the component estimating unit 80 (S61).

An example of the analysis sound data input to the component estimating unit 80 is illustrated in FIG. 7. In FIG. 7, the horizontal axis represents time, the vertical axis represents frequency, and shades of colors represent magnitudes of sound pressures. A darker color represents a higher sound pressure. An area A including data with a relatively high sound pressure is surrounded by a dotted line.

Figure 8:
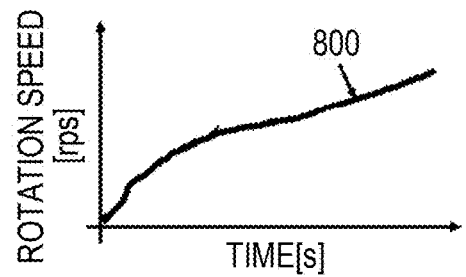
FIG. 8 is a diagram illustrating an example of analysis rotation speed data.

An example of the analysis rotation speed data input to the component estimating unit 80 is illustrated in FIG. 8. In FIG. 8, the rotation speed is indicated by a solid line 800.

The degree calculating unit 81 calculates a degree of sound which is estimated as noise based on the analysis sound data and the analysis rotation speed data input to the component estimating unit 80. The degree calculating unit 81 first calculates a loudest sound frequency which is a frequency indicating a loudest sound pressure at predetermined time intervals and generates loudest frequency data (S62). Here, the frequency in the area A is considered to be extracted.

Figure 9:
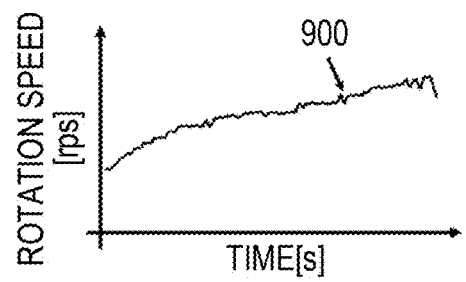
FIG. 9 is a diagram illustrating an example of loudest sound frequency data.

Regarding the analysis sound data, "sound other than noise is included" is selected in S43 in FIG. 5 or the extraction process is performed thereon such that sound other than noise is excluded in S5 in FIG. 3. Accordingly, there is a high likelihood that the loudest sound frequency will be a frequency of noise which is felt by the user. An example of the extracted loudest sound frequency data is illustrated in FIG. 9. In FIG. 9, the extracted loudest sound frequency is indicated by a solid line 900.

The degree calculating unit 81 calculates a degree of the loudest sound frequency data extracted in S62 using the loudest sound frequency data and the analysis rotation speed data (S63).

Figure 10:
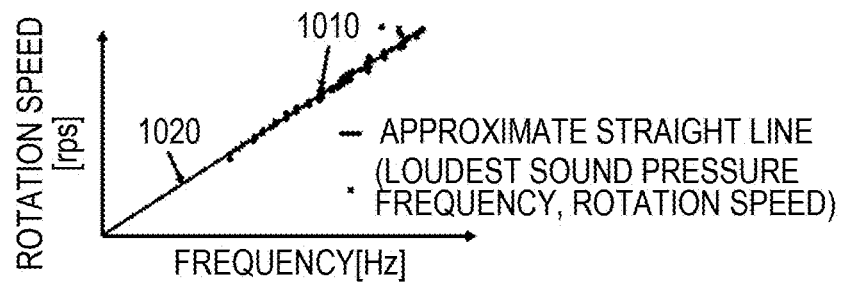
FIG. 10 is a diagram illustrating a group of loudest sound frequency data and a rotation speed and an approximate straight line thereof.

In S63, linear approximation is performed on a plurality of groups of numerical values of the loudest sound frequency data and the analysis rotation speed data at predetermined time intervals using a least squares method or the like. Here, the linear approximation is performed such that an intercept is 0. In FIG. 10, the horizontal axis represents the frequency, the vertical axis represents the rotation speed, and an example of points 1010 indicating groups of numerical values of the loudest sound frequency data and the analysis rotation speed data and a straight line 1020 indicating a result of linear approximation performed on the numerical values is illustrated. Only one of the points indicating the groups of numerical values is numbered and others are not illustrated. The degree calculating unit 81 calculates a slope of the straight line as a degree.

When the degree is calculated by the degree calculating unit 81, the degree comparing unit 83 estimates a component which is a sound source candidate of noise based on the calculated degree (S64). In general, a degree can be calculated as a value which is obtained by dividing a frequency at a certain time by a rotation speed at that time, but the calculated degree may not match a component degree of a sound source component of noise. This is because there is a slight difference between a component degree determined by specifications of each component and a degree of sound actually generated from the component due to a manufacturing error or the like.

Therefore, the degree comparing unit 83 compares the degree calculated by the degree calculating unit 81 with component degrees of a plurality of components mounted in the vehicle 200, which is acquired by the component degree information acquiring unit 82, and estimates a component having a component degree closest to the calculated degree as a candidate for a sound source of noise. Accordingly, even when there is a difference between the calculated degree and the component degree of the component which is a sound source of noise, it is possible to estimate a candidate for a sound source of noise.

The degree which is calculated from the loudest sound frequency and the rotation speed at a certain time may be different from the component degree of the sound source even with the same component as the sound source due to an influence of an environment for detection of sound, sound other than noise, and the like. In this embodiment, the degree is calculated based on a plurality of groups of numerical values of the loudest sound frequency data and the analysis rotation speed data at predetermined time intervals. Accordingly, it is possible to reduce an influence of the environment or the sound other than noise.

The degree comparing unit 83 may estimate a plurality of components having a component degree within a predetermined range from the calculated degree as candidates for a sound source of noise in addition to the component having the component degree closest to the calculated degree out of the plurality of components mounted in the vehicle 200.

When a sound source of noise has been estimated, the routine proceeds to S7 in FIG. 3 and the sound source estimation device 100 displays information on components estimated as the sound source candidate of noise on the display unit 70. Examples of the information displayed on the display unit 70 include a name, a shape, a mounted position, a check method, a repair method, and a replacement method of a component.

The user can perform check, repair, replacement, or the like on the component estimated as a candidate for a sound source of noise according to necessity.

Figure 11:
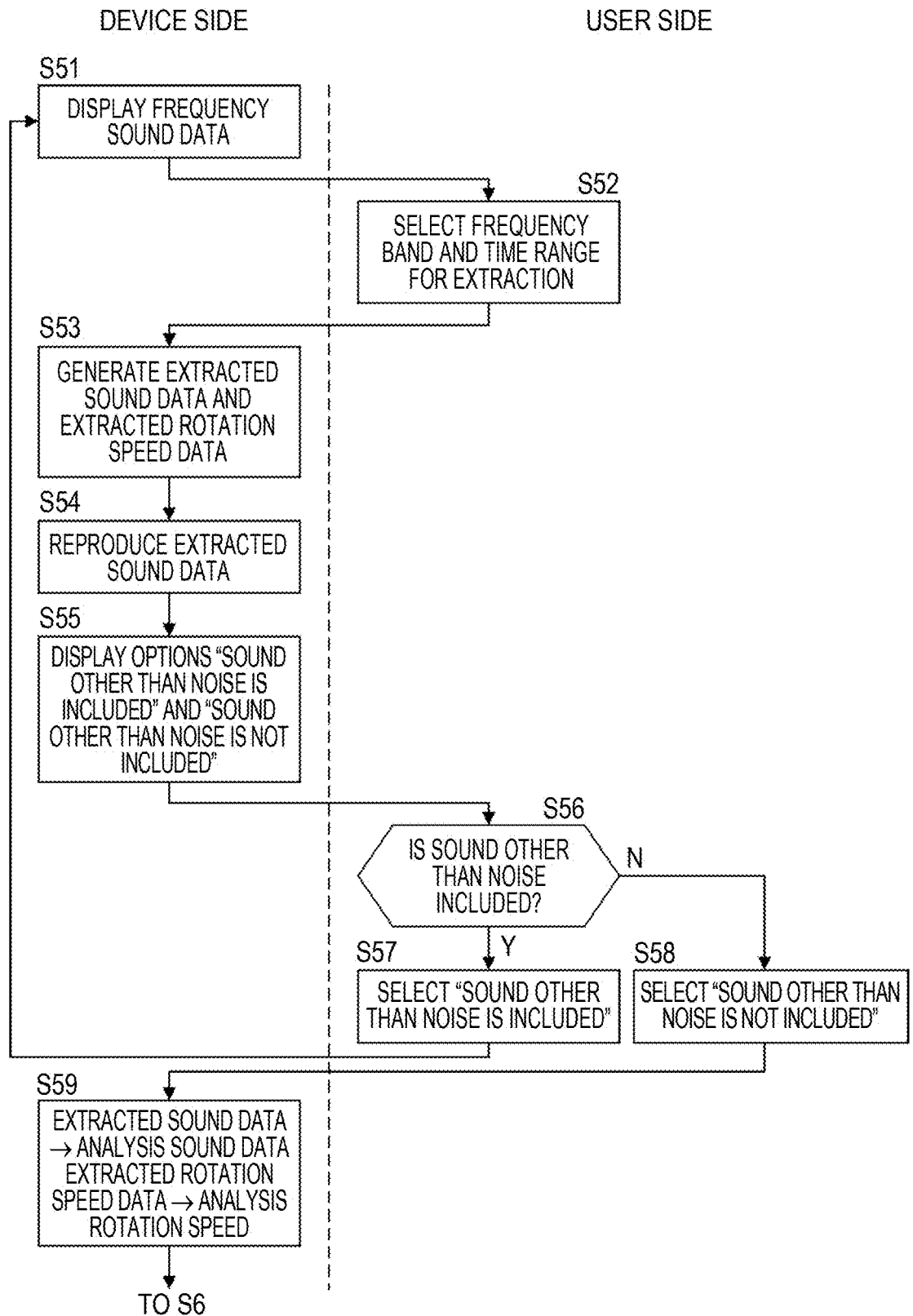
FIG. 11 is a diagram illustrating details of an extraction process.

The extraction process which is performed in S5 in FIG. 3 will be described below. FIG. 11 illustrates a routine of a data extracting process. The extraction processing unit 92 displays frequency sound data on the display unit 70 (S51) and waits for an input of an operation from the user.

Figure 12:
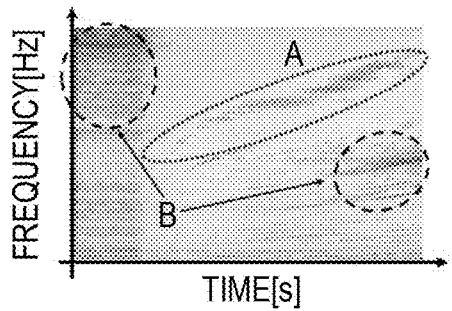
FIG. 12 is a diagram illustrating an example of frequency sound data including sound other than noise.

An example of the frequency sound data which is displayed is illustrated in FIG. 12. In FIG. 12, it is assumed that data of noise which is felt by the user of the vehicle 200 is included in an area A surrounded by a dotted line. Here, a sound pressure higher than the sound pressure in the area A is included in an area B surrounded by a broken line. Accordingly, when the processing is performed by the degree calculating unit 81 in this way, there is a likelihood that a frequency of noise will not be extracted as a loudest sound frequency in S62 in FIG. 6.

The user selects a desired frequency band or a desired time range from the frequency sound data (S52). Specifically, the user selects a desired frequency band or a desired time range which is extracted, or both thereof from the same image as illustrated in FIG. 12, which is displayed on the display unit 70, using the input unit 60.

Figure 13:
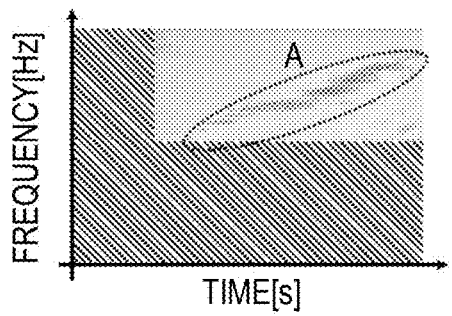
FIG. 13 is a diagram illustrating an example of extracted sound data of which an extraction range is selected.

FIG. 13 illustrates frequency sound data when the user selects both an arbitrary frequency band and an arbitrary time range. A hatched portion in FIG. 13 indicates an area which is not selected by the user. The extraction processing unit 92 extracts arbitrary frequency sound data selected by the user from the sound data and generates extracted sound data. The extraction processing unit 92 also generates extracted rotation speed data in the time range selected by the user from the rotation speed data (S53). Accordingly, it is possible to exclude an area including a relatively high sound pressure other than the area A including noise which is felt by the user.

Then, the sound source estimation device 100 reproduces the extracted sound data using the reproduction unit 50 (S54). Accordingly, it is possible to allow the user to ascertain the extracted sound.

Then, the sound source estimation device 100 displays options such as "sound other than noise is included" and "sound other than noise is not included" on the display unit 70 (S55).

The user determines whether sound other than noise is included in the sound ascertained in S54 (S56), and selects one option using the input unit 60. When "sound other than noise is not included" is selected (S57), the sound source estimation device 100 determines the extracted sound data and the extracted rotation speed data as analysis sound data and analysis rotation speed data (S59) and then the routine proceeds to S6.

When "sound other than noise is not included" is selected (S57), the sound source estimation device 100 displays the frequency sound data again (S51) and returns to the state in which it waits for an input of an operation from the user.

In S55, an option "sound is reproduced" in addition to the two options may be displayed on the display unit 70. When the user selects "sound is reproduced" using the input unit 60, the detected sound is reproduced by the reproduction unit 50. Accordingly, the user can ascertain the detected sound again.

Through this extraction process, sound outside the range selected by the user can be excluded and it is possible to enhance the likelihood that the frequency of noise will be extracted as the loudest sound frequency in S62 in FIG. 6.

With the sound source estimation system of the sound source estimation device 100 described above, even when there is a difference between a degree of the loudest sound pressure and a degree of a component which is a sound source of noise, it is possible to estimate a candidate for the sound source.

The sound source estimation system according to the present disclosure may be a system which is provided in a smartphone. In this case, a microphone for voice communication is used as the microphone 10 and a speaker for notifying of an incoming call or the like is used as the reproduction unit 50. A touch panel is used as the input unit 60 and the display unit 70. A communication device that communicates with the outside is used as the rotation speed acquiring unit 30, and can acquire a rotation speed by communication with the vehicle 200. In general, a recording medium such as a flash memory for recording data is provided in a smartphone, and this recording medium can be used as the data recording unit 40. A program for performing the processes of the timer 20, the component estimating unit 80, and the data editing unit 90 can be stored in the recording medium and a sound source can be estimated by causing a central processing unit to execute the program.

The sound source estimation device 100 may be a device which is mounted in the vehicle 200 instead of a mobile terminal independent of the vehicle 200.

The user of the sound source estimation system according to the present disclosure may be a user of the vehicle 200 or may be a staff member of a maintenance factory which the vehicle 200 enters or the like. When a staff member uses the sound source estimation device 100, the staff member may perform an operation associated with detection of sound in S12 or an operation associated with extraction of sound in S52 and the user of the vehicle 200 may perform ascertainment of noise and the like in S16, S42, and S56. The operations may be performed by the staff member and the user of the vehicle 200 together.

Figure 14:
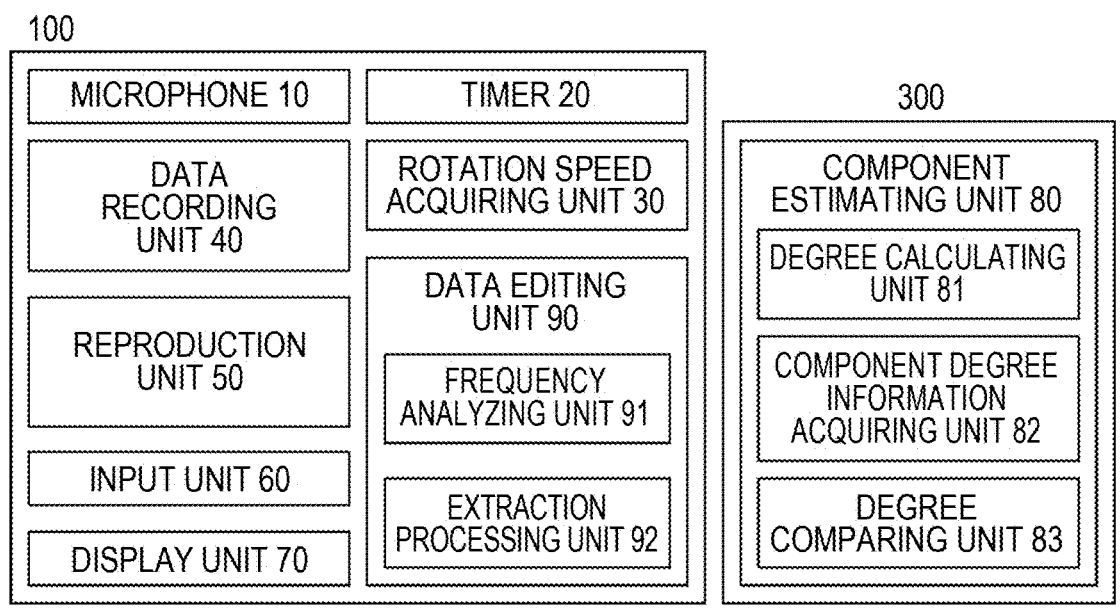
FIG. 14 is a diagram illustrating configurations of a sound source estimation device and a sound source estimation server.

In the aforementioned embodiment, the sound source estimation device 100 includes all the elements of the sound source estimation system according to the present disclosure. However, the elements may be distributed and provided in a plurality of devices. For example, as illustrated in FIG. 14, the microphone 10, the rotation speed acquiring unit 30, the timer 20, the display unit 70, the input unit 60, and the reproduction unit 50 may be provided in the sound source estimation device 100, and the data recording unit 40, the component estimating unit 80, and the data editing unit 90 may be provided in an external sound source estimation server 300. In this case, by causing the sound source estimation device 100 to perform the processes of S1 to S5 in FIG. 3, analysis sound data and analysis rotation speed data are generated. Thereafter, the analysis sound data and the analysis rotation speed data are transmitted to the sound source estimation server 300 by a communication means or the like, and the analysis of S6 is performed by the sound source estimation server 300. Information on a component which is estimated as a sound source candidate of noise is transmitted from the sound source estimation server 300 to the sound source estimation device 100 and is output by the sound source estimation device 100.

In the aforementioned embodiment, the microphone 10 is used as a sound and vibration acquiring unit. The sound and vibration acquiring unit may be a vibration pickup that detects vibration. In this case, noise is abnormal vibration which is generated in the vehicle 200, and the sound source estimation system estimates a candidate for a vibration source of the abnormal vibration.

In the aforementioned embodiment, the engine 210 is used as a rotary device. However, the rotary device is not particularly limited as long as it generates a rotational motion and a plurality of components moves by the rotational motion, and may be, for example, a motor.

In the aforementioned embodiment, the vehicle 200 is used as an object in which a sound source is estimated. However, the object is not limited to the vehicle, and may be any device as long as it includes a rotary device such as an engine or a motor and a plurality of components that moves with a rotational motion generated by the rotary device. For example, an aircraft in which a propeller is rotated by a rotary device or a ship in which a screw is rotated by a rotary device can be used as the object.

In the aforementioned embodiment, the display unit 70 is used as an output unit. However, the output unit is not limited to the configuration for displaying information. For example, the output unit may be a device that outputs information as prints or a device that outputs information by voice.

Information on a sound source candidate is not output to the user but may be output to another device. In this case, the output unit may be a communication unit that outputs a signal from the sound source estimation device 100 to another device. The other device acquiring information on a sound source candidate from the sound source estimation device 100 can estimate a component which is a sound source candidate with higher accuracy by additionally performing analysis in consideration of information other than the information acquired from the sound source estimation device 100.

In the aforementioned embodiment, loudness of sound is described as a magnitude of a sound pressure. However, an index of the loudness of sound is not limited to the sound pressure and may be, for example, a magnitude of a sound pressure level or a magnitude of sensation intensity which is expressed in the units of phon or sone.

The aforementioned embodiments may be appropriately combined. It should be understood that the aforementioned embodiments are exemplary in all respects and are not restrictive. The scope of the present disclosure is defined by the appended claims, not by the description of the aforementioned embodiments and is intended to include all modifications without departing from the meanings and scope equivalent to the claims.

What is claimed is:

1. A sound source estimation system comprising:
   a sound and vibration acquiring unit configured to acquire sound which is generated from an object;
   a rotation speed acquiring unit configured to acquire a rotation speed of a rotary device which is mounted in the object and which generates a rotational motion;
   a frequency analyzing unit configured to generate frequency sound data indicating change of a frequency spectrum of sound detected by the sound and vibration acquiring unit;
   a degree calculating unit configured to calculate a degree of a loudest sound frequency which is a frequency indicating loudest sound in the frequency sound data based on the loudest sound frequency and the rotation speed acquired by the rotation speed acquiring unit;
   a component degree information acquiring unit configured to acquire degree information of a plurality of components associated with sound which is generated from the plurality of components mounted in the object with the rotational motion;
   a degree comparing unit configured to determine a component with a degree closest to the degree calculated by the degree calculating unit as a sound source candidate of noise based on the degree information acquired by the component degree information acquiring unit; and
   an output unit configured to output information on the sound source candidate of noise.

2. The sound source estimation system according to claim 1, wherein the degree calculating unit calculates the degree based on the loudest sound frequency for each predetermined time and the rotation speed for each predetermined time.

3. The sound source estimation system according to claim 2, wherein the degree calculating unit calculates an approximate straight line of which an intercept is 0 for a plurality of groups of the loudest sound frequency for each predetermined time and the rotation speed for each predetermined time and calculates a slope of the approximate straight line as the degree.

4. The sound source estimation system according to claim 1, further comprising a data extracting unit configured to perform a process of extracting arbitrary frequency sound data out of the frequency sound data generated by the frequency analyzing unit,
   wherein the degree calculating unit extracts the loudest sound frequency from the arbitrary frequency sound data subjected to the extraction process and calculates the degree based on the loudest sound frequency and the rotation speed.

5. A sound source estimation method comprising:
   a sound and vibration acquiring step of acquiring sound which is generated from an object;
   a rotation speed acquiring step of acquiring a rotation speed of a rotary device which is mounted in the object and which generates a rotational motion;
   a frequency analyzing step of generating frequency sound data indicating change of a frequency spectrum of sound detected in the sound and vibration acquiring step;
   a degree calculating step of calculating a degree of a loudest sound frequency which is a frequency indicating loudest sound in the frequency sound data generated in the frequency analyzing step based on the loudest sound frequency and the rotation speed of the rotary device acquired in the rotation speed acquiring step;
   a component degree information acquiring step of acquiring degree information of a plurality of components associated with sound which is generated from the plurality of components mounted in the object with the rotational motion;
   a degree comparing step of determining a component with a degree closest to the degree calculated in the degree calculating step as a sound source candidate of noise based on the degree information acquired in the component degree information acquiring step; and
   an output step of outputting information on the sound source candidate of noise.

* * * * *